(12) United States Patent
Shapero

(10) Patent No.: US 11,053,681 B2
(45) Date of Patent: Jul. 6, 2021

(54) GROUND BEAM AND T-SHAPED OR X-SHAPED MEMBER FOR A MODULAR CONSTRUCTED BUILDING AND A BUILDING INCORPORATING SAME

(71) Applicant: Robin William Shapero, Billericay (GB)

(72) Inventor: Robin William Shapero, Billericay (GB)

( * ) Notice: Subject to any disclaimer, the term of this patent is extended or adjusted under 35 U.S.C. 154(b) by 0 days.

(21) Appl. No.: 16/468,228

(22) PCT Filed: Dec. 12, 2017

(86) PCT No.: PCT/GB2017/053721
§ 371 (c)(1),
(2) Date: Jun. 10, 2019

(87) PCT Pub. No.: WO2018/109460
PCT Pub. Date: Jun. 21, 2018

(65) Prior Publication Data
US 2020/0011053 A1      Jan. 9, 2020

(30) Foreign Application Priority Data
Dec. 12, 2016  (GB) ..................... 1621129

(51) Int. Cl.
*E04B 5/02*      (2006.01)
*E04B 1/28*      (2006.01)
(Continued)

(52) U.S. Cl.
CPC ............... *E04B 5/026* (2013.01); *E04B 1/28* (2013.01); *E04B 1/34321* (2013.01);
(Continued)

(58) Field of Classification Search
CPC .... E04B 1/28; E04B 1/34321; E04B 1/34807; E04B 5/026; F16B 5/0012; E04C 2003/043
(Continued)

(56) References Cited

U.S. PATENT DOCUMENTS 7,546,716 B1    6/2009  Asadurian
8,522,500 B1 *  9/2013  Brown ...................... E04B 1/14
                                                              52/404.4
(Continued)

FOREIGN PATENT DOCUMENTS

FR      2869656 A1     11/2005
GB      2433271 A       6/2007
WO    WO 2008/139175 A2  11/2008

*Primary Examiner* — Beth A Stephan
(74) *Attorney, Agent, or Firm* — Edwin D. Schindler

(57) ABSTRACT

A modular constructed building includes a plurality of ground beams and a plurality of wall panels, each ground beam has a pair of surfaces and a longitudinally extending male projection interspaced between the pair of surfaces. The extending male projection is formed as a flat plate and at least able to be partially inserted into a wall panel with each of the wall panels being secured to a respective ground beam, so that each wall panel, at an end opposite the ground beam, has a lateral groove for accepting a protrusion for a T-shaped member or an X-shaped member, and an upper end of each of the wall panels is retained together through each of the wall panels and either a T-shaped member or an X-shaped member.

10 Claims, 11 Drawing Sheets

Figure 1:
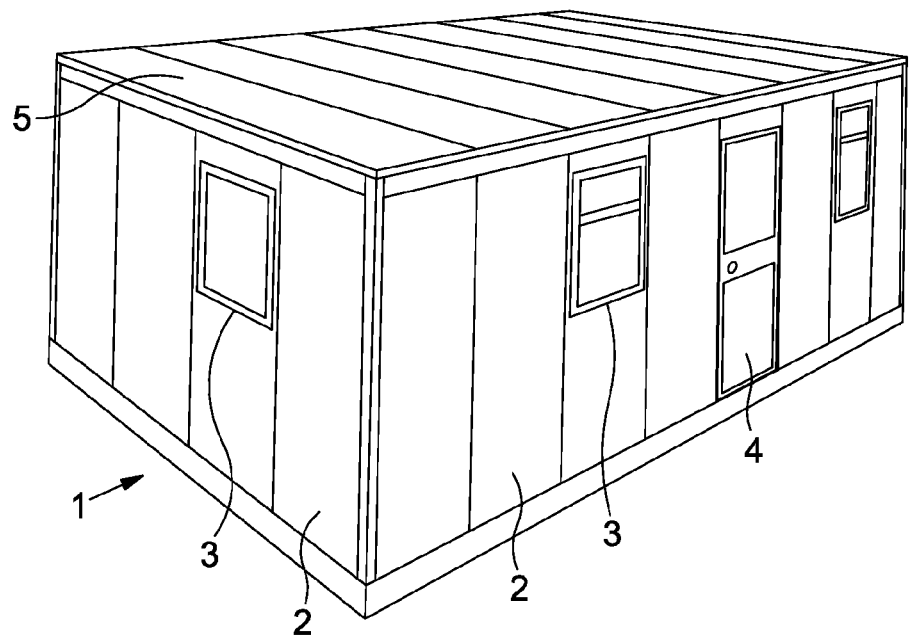

(51) Int. Cl.
  *E04B 1/343*  (2006.01)
  *E04B 1/348*  (2006.01)
  *E04H 1/00*   (2006.01)
  *F16B 5/00*   (2006.01)
  *E04C 3/04*   (2006.01)

(52) U.S. Cl.
  CPC ......... *E04B 1/34807* (2013.01); *E04H 1/005* (2013.01); *F16B 5/0012* (2013.01); *E04C 2003/043* (2013.01)

(58) Field of Classification Search
  USPC .................................................... 52/570, 578
  See application file for complete search history.

(56) References Cited

U.S. PATENT DOCUMENTS

| | | | | |
|---|---|---|---|---|
| 2006/0010810 A1* | 1/2006 | Muszynski | ............... | E04C 1/42 52/503 |
| 2015/0240485 A1* | 8/2015 | Yesil | ........................ | E04B 2/18 52/309.13 |

* cited by examiner

GROUND BEAM AND T-SHAPED OR X-SHAPED MEMBER FOR A MODULAR CONSTRUCTED BUILDING AND A BUILDING INCORPORATING SAME

BACKGROUND OF THE INVENTION

Technical Field of the Invention

This invention relates to a ground beam for a modular constructed building and a building incorporating same.

Description of the Prior Art

With the current shortage of housing there is a need to provide buildings that may be constructed more rapidly than with traditional one metre, or more, foundations and brick and mortar or wooden frame construction. With such forms of construction it, typically, takes a minimum of four months to construct a single building. Also, the cost of such a traditional form of construction is prohibitively expensive for the average wage earner.

Furthermore, such traditional forms of construction are susceptible to collapse in earthquake zones, leading to loss of life.

The present invention seeks to at least partially mitigate some or all of the foregoing problems.

SUMMARY OF THE INVENTION

According to a first aspect of this invention there is provided a ground beam for a modular constructed building having a pair of surfaces for supporting one or more wall panels and a longitudinally extending male projection interspaced between said surfaces, which said projection is capable of being at least partially inserted into a wall panel.

Preferably, the ground beam is formed of two conjoined longitudinal sections, each section providing one of said surfaces, and at the confluence between the sections is said longitudinally extending male projection.

Advantageously, said sections are longitudinally extending box sections with each box section providing one of said surfaces.

Advantageously, said ground beam is further formed with another longitudinal box section having a lower height than said two conjoined longitudinal box sections such that a planar upper surface of said another longitudinal box section is capable of supporting one or more floor joists or floor panels.

Advantageously, said ground beam is formed of glass reinforced plastic (GRP).

According to a further aspect of this invention there is provided a modular constructed building including a plurality of ground beams and one or more wall panels, each said ground beam having a pair of surfaces for supporting said one or more wall panels and a longitudinally extending male projection interspaced between said surfaces and which said projection is capable of being at least partially inserted into a said wall panel, and securing means for securing said one or more wall panels to a respective ground beam.

Preferably, the ground beam is formed of two conjoined longitudinally extending box sections, each box section providing one of said surfaces, and at the confluence between the box sections is said longitudinally extending male projection.

Advantageously, said ground beam is further formed with another longitudinally extending box section having a lower height than said two conjoined longitudinal box sections such that a planar upper surface of said another longitudinal box section is capable of supporting one or more floor joists or floor panels.

Preferably, said ground beams are formed in a rectilinear shape with adjacent corners of the ground beams being connected together by securing means.

Preferably, said wall panel is provided with interlinking means to interconnect with an adjacent wall panel.

Conveniently, said interlinking means is a tongue and groove arrangement.

Advantageously, said panels at each vertical corner are supported by a vertically extending L-shaped member having a male protrusion extending from one limb of the L-shape and a female recess extending into the other limb of the L-shape for engaging with appropriate recesses and protrusions respectively in adjacent wall panels.

Advantageously, further securing means are provided for securing the L-shaped member to the engaged wall panel.

Preferably, said one or more wall panels at an end opposite said ground beams has a lateral groove arranged to accept a protrusion for a T or X-shaped member, whereby the upper end of the walls are retained together by securement means extending through the wall panel and the T or X-shaped member.

Conveniently, to accommodate roof trusses, a T-shaped member has an upper planar surface thereof shaped to accept each said truss.

Advantageously, the X-shaped member is arranged to also support upper story wall panels and upper story floor joists.

BRIEF DESCRIPTION OF THE DRAWING FIGURES

Figure 2:
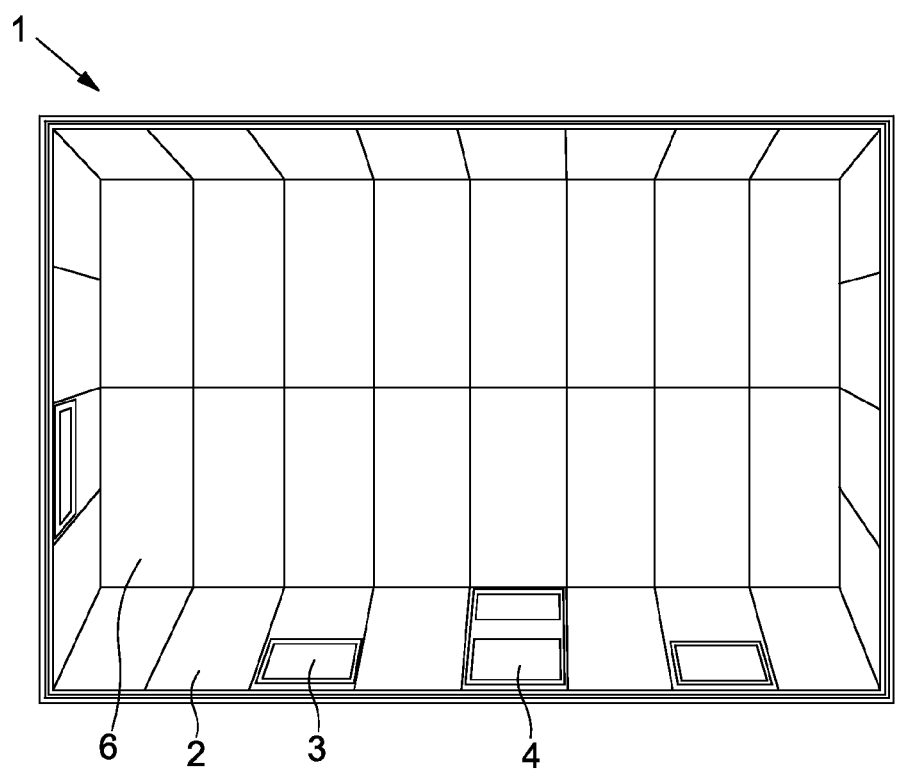
Figure 3:
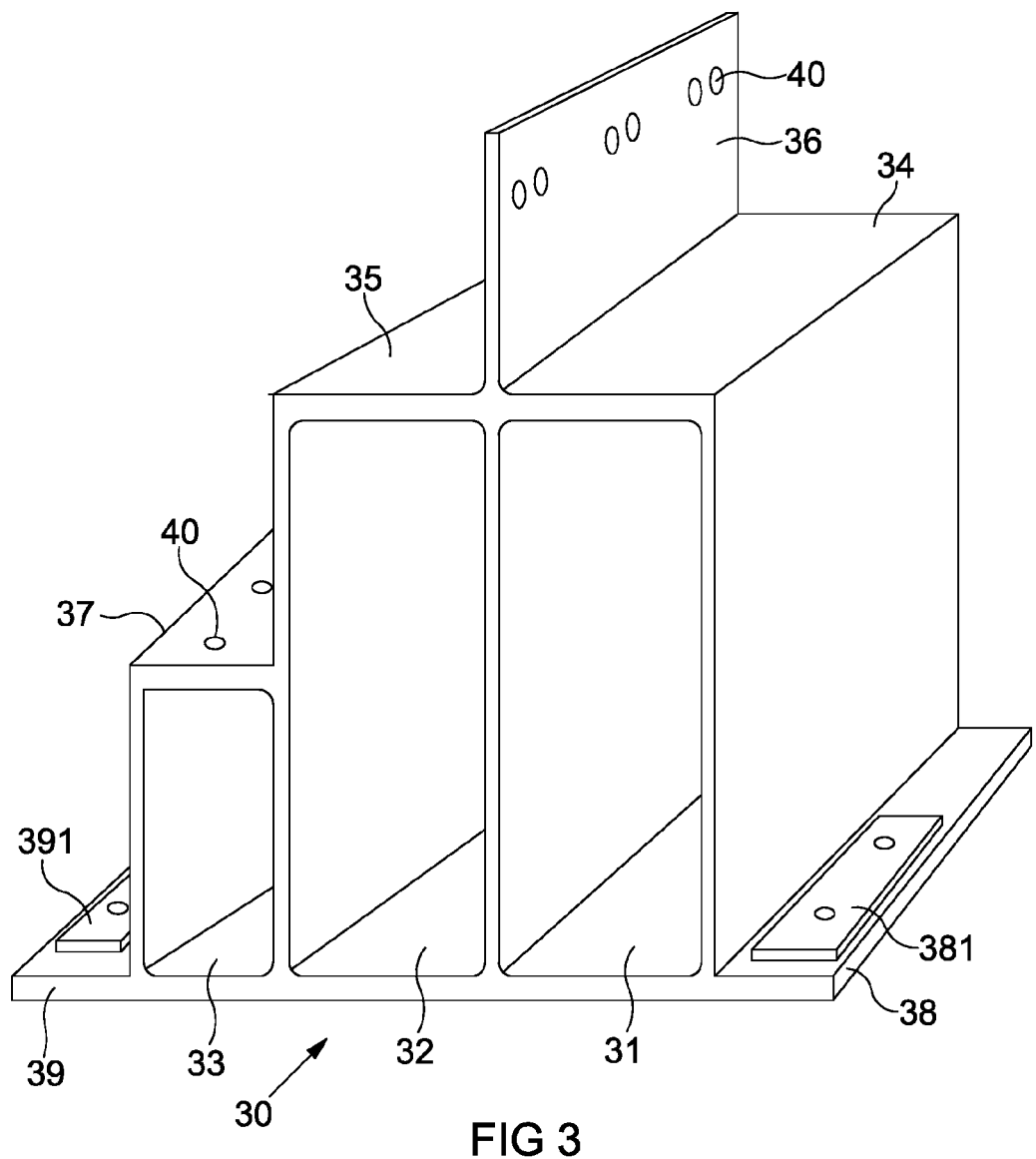
Figure 4:
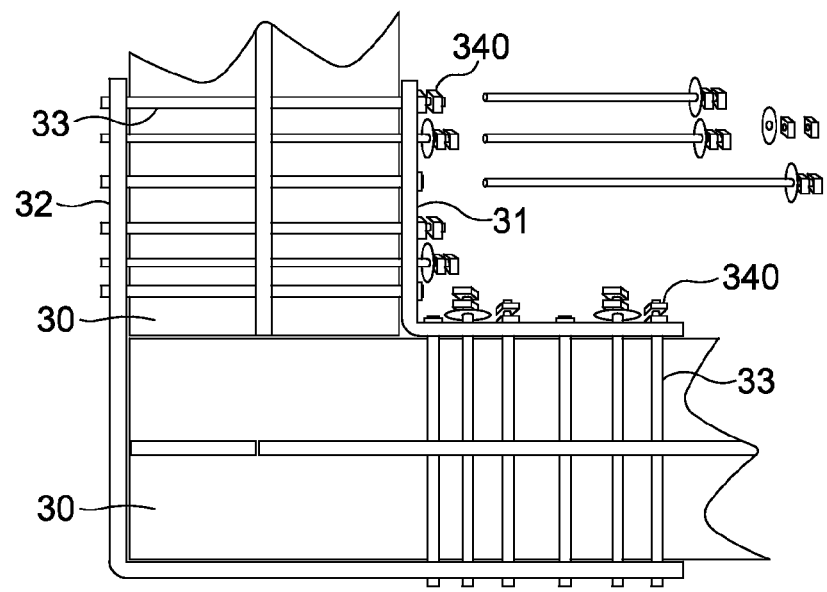
Figure 5:
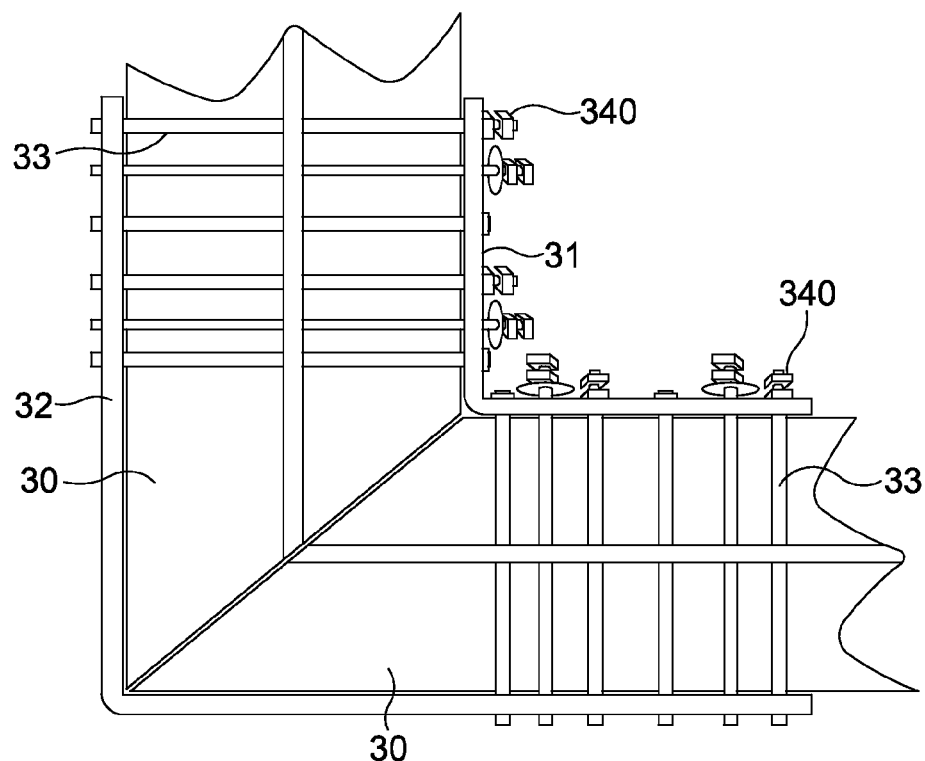
Figure 6:
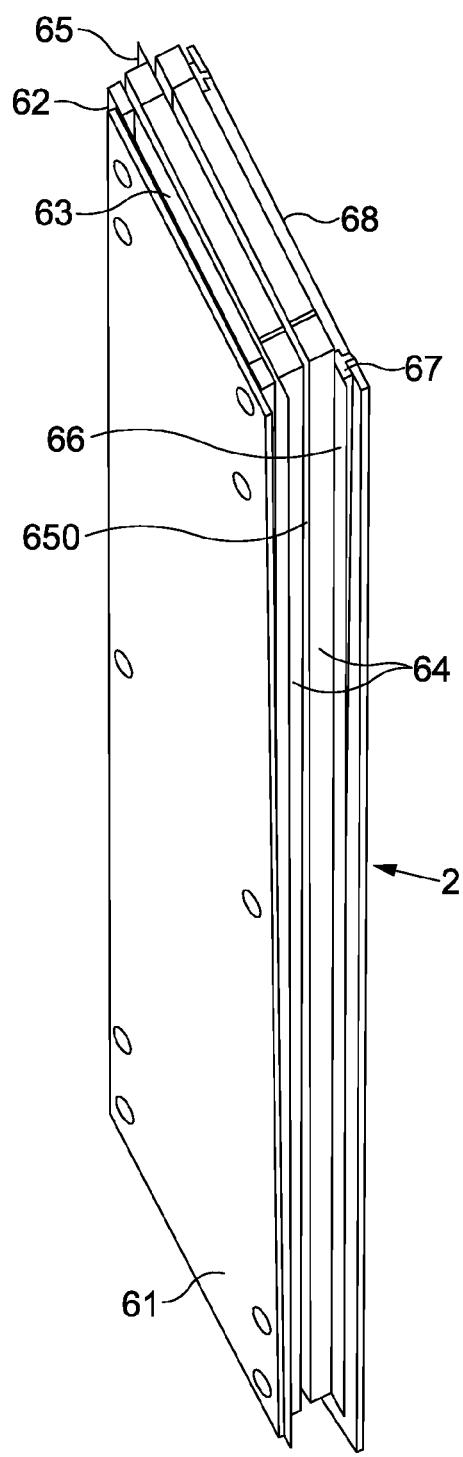
Figure 7:
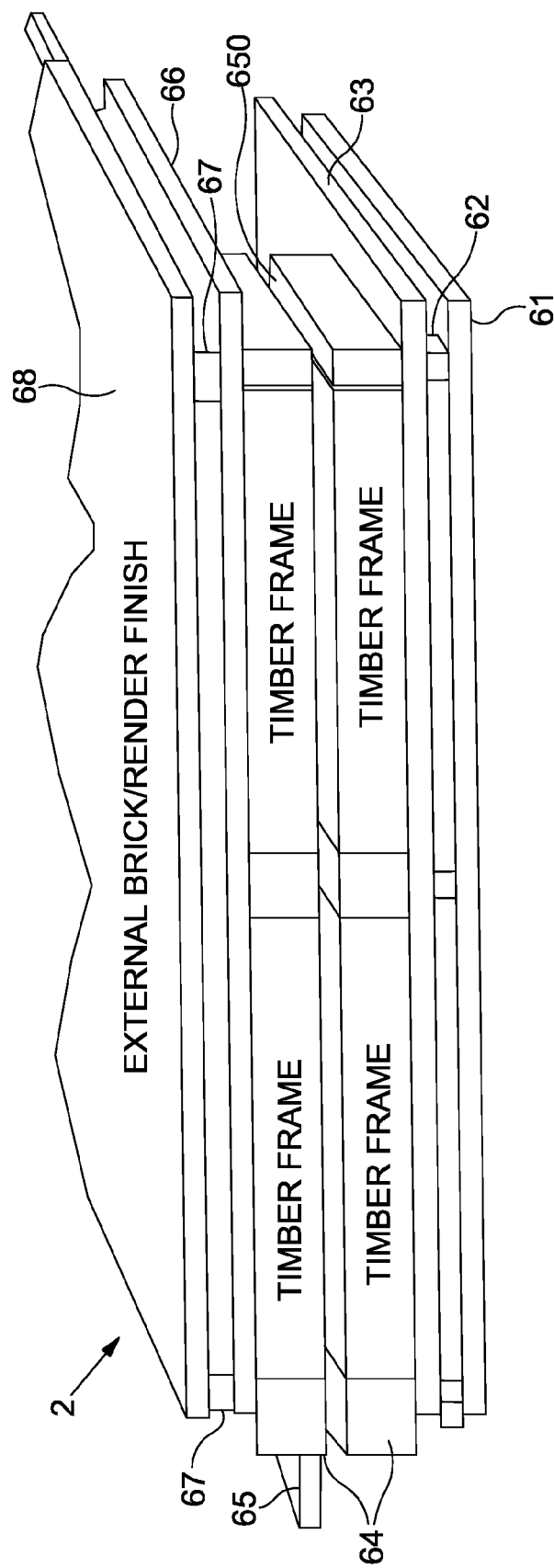
Figure 8:
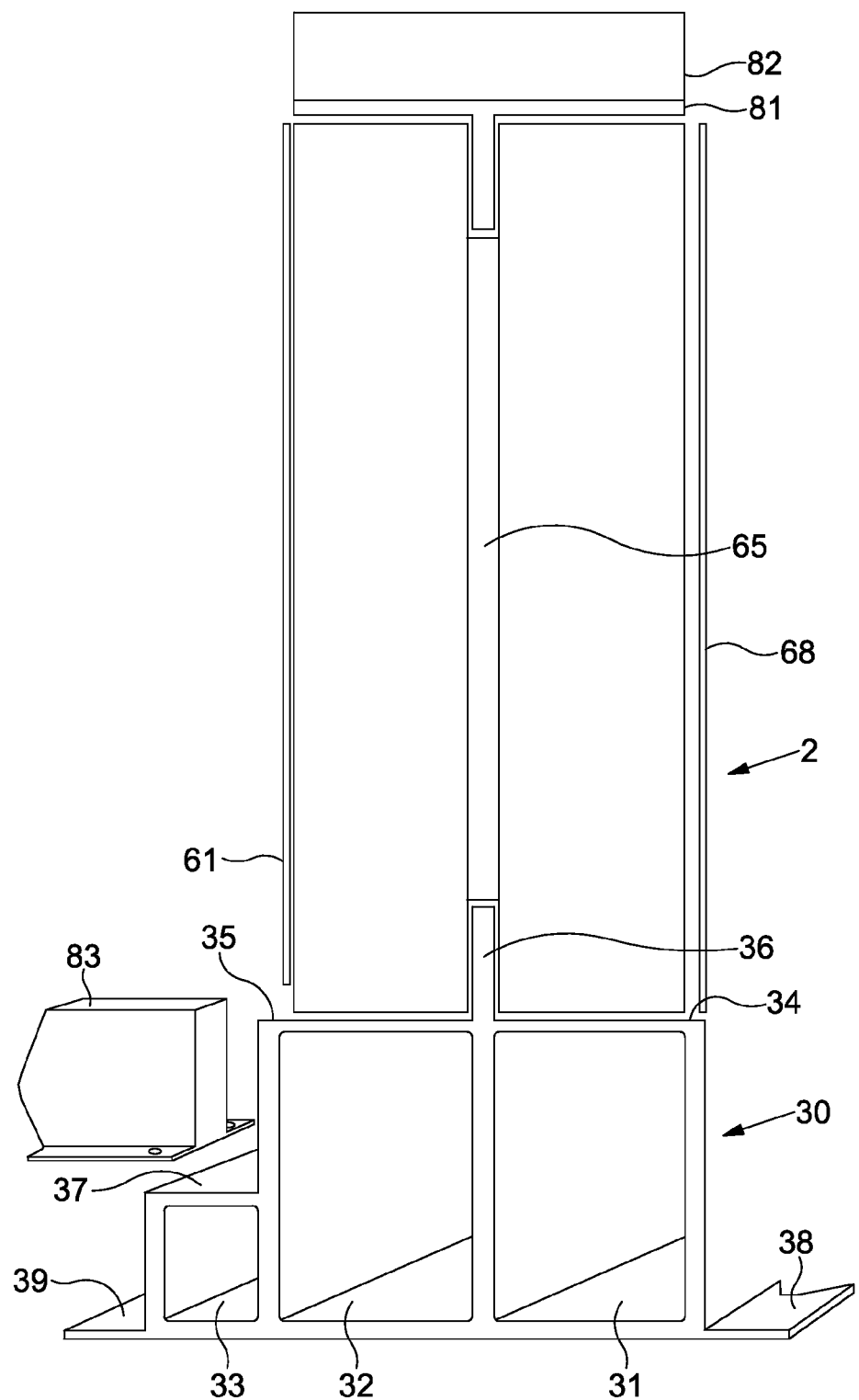
Figure 9:
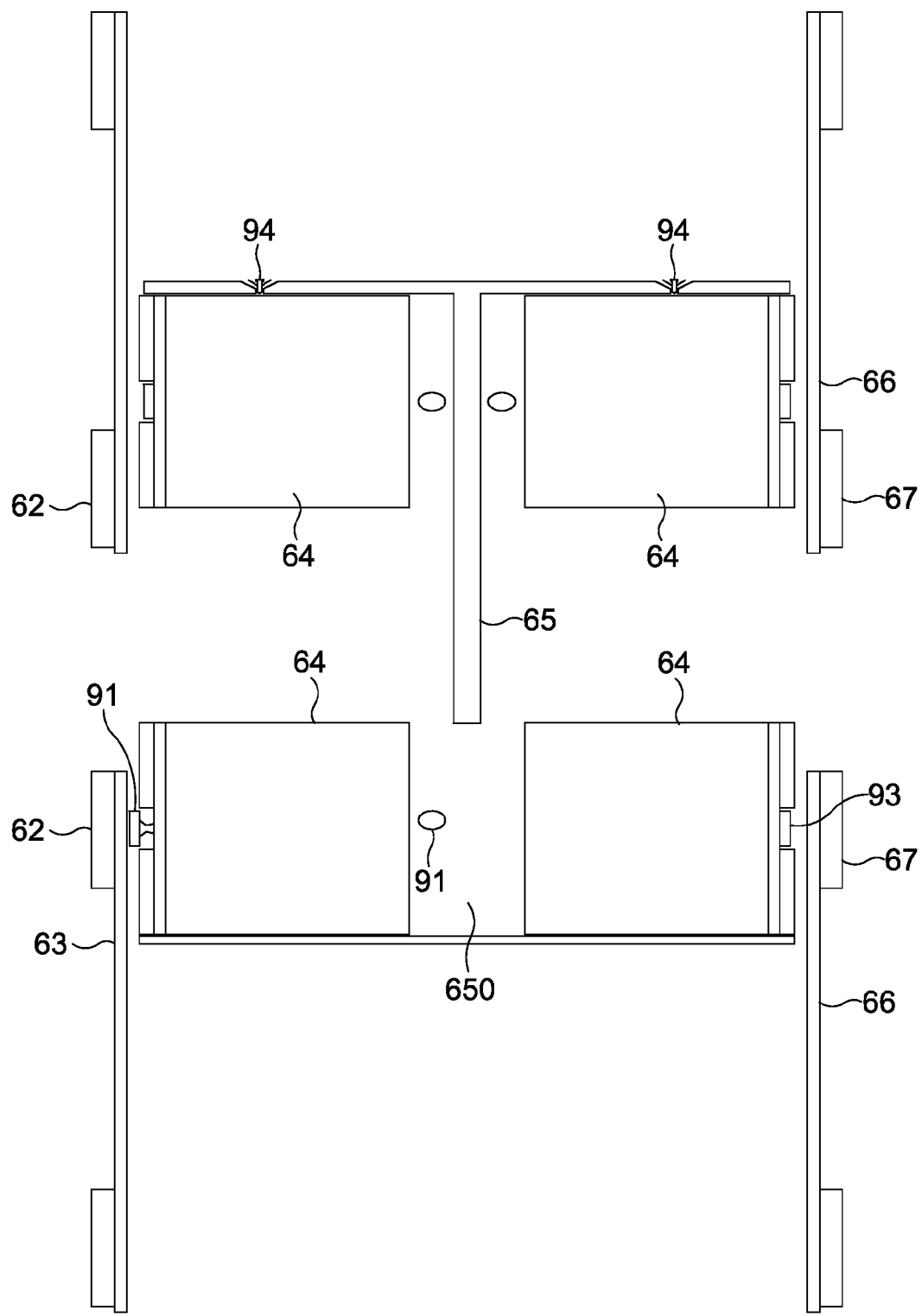
Figure 10A:
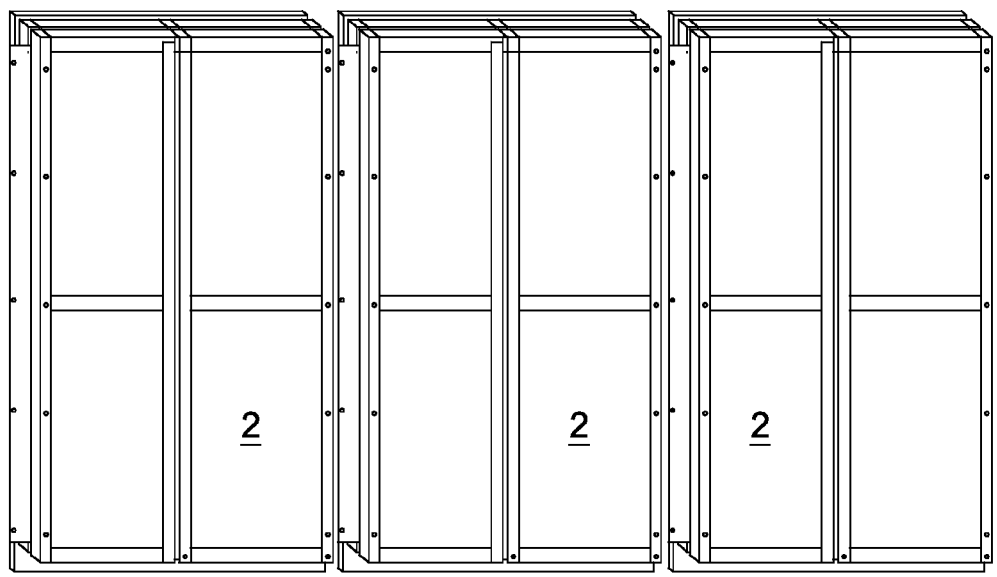
Figure 10B:
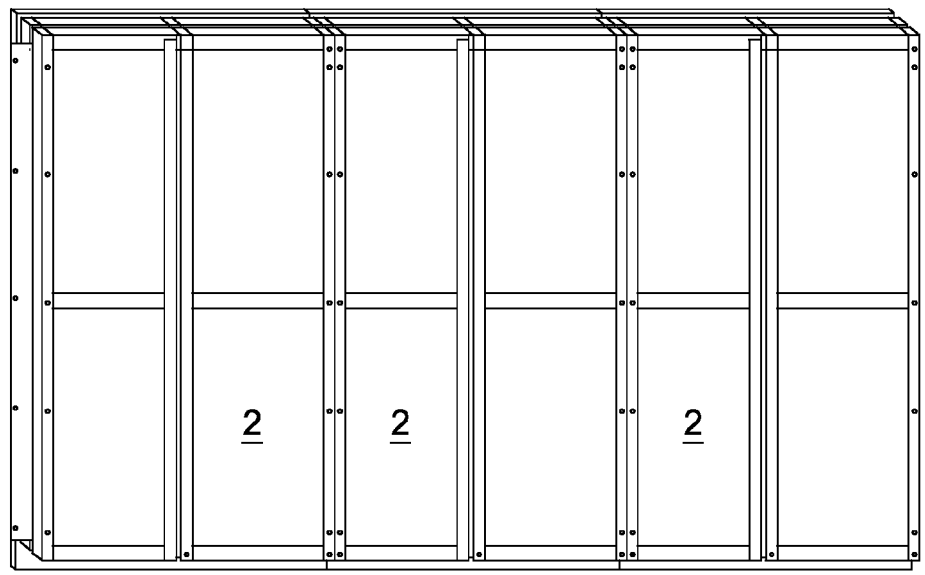
Figure 11:
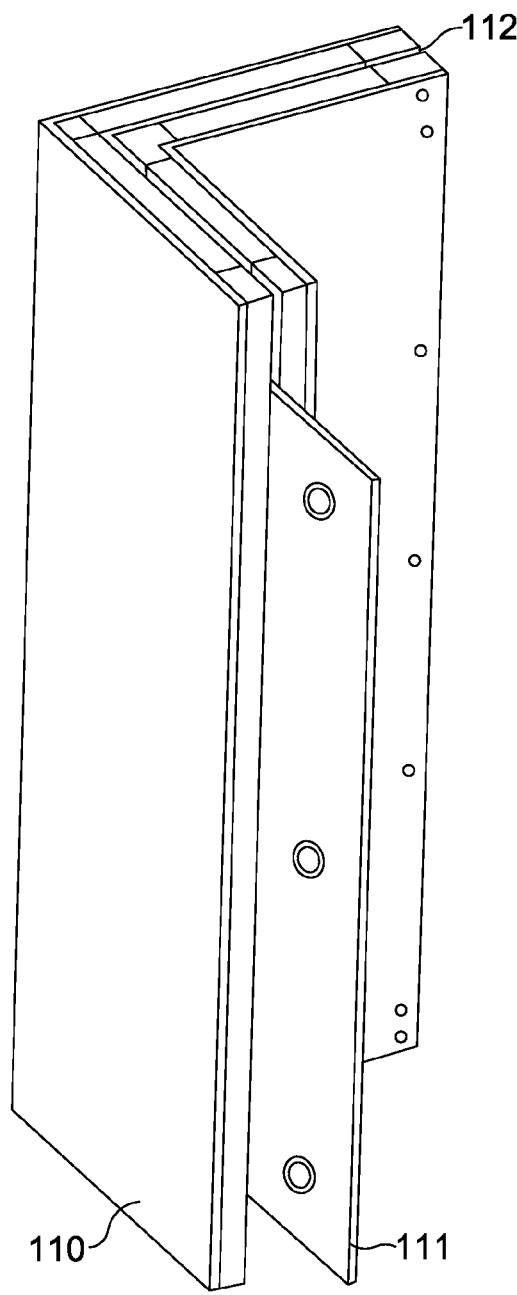
Figure 12C:
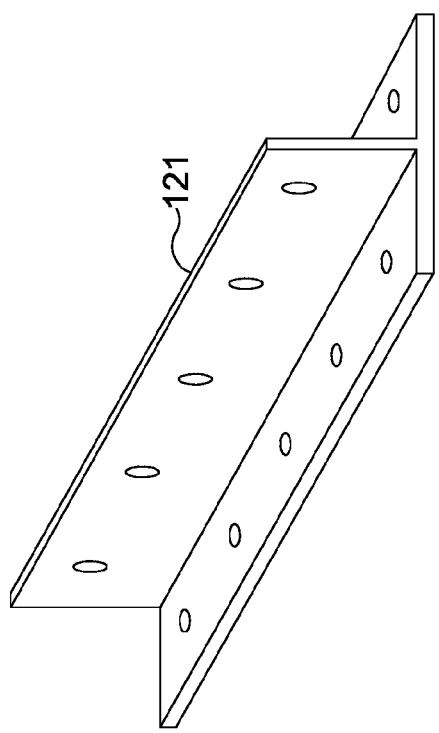
Figure 12B:
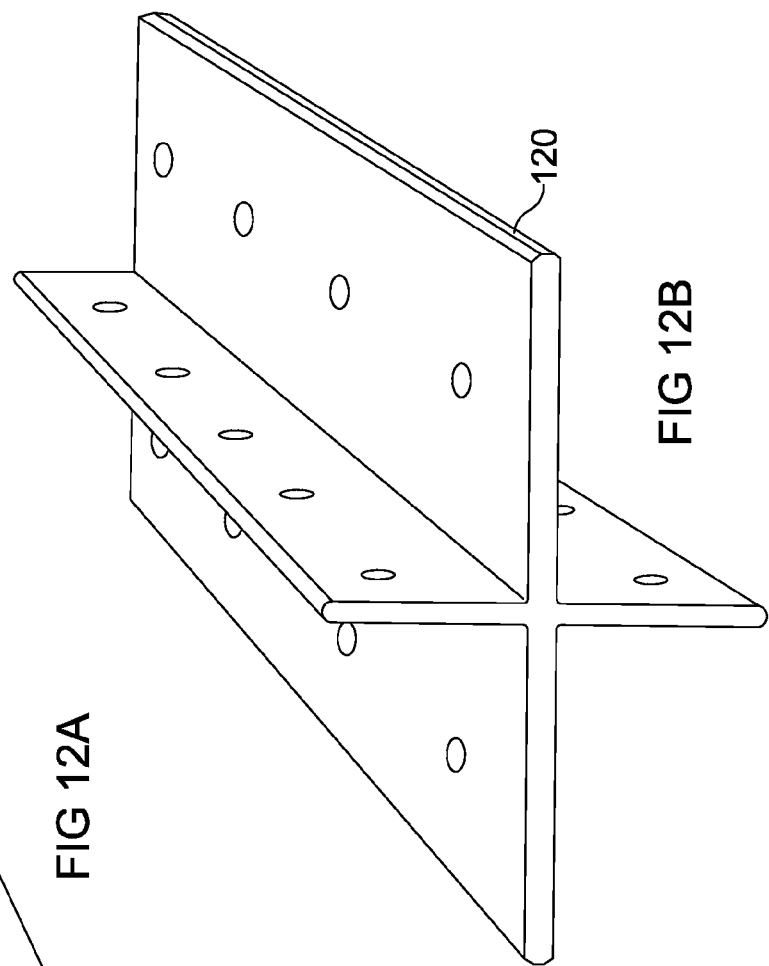
Figure 12A:
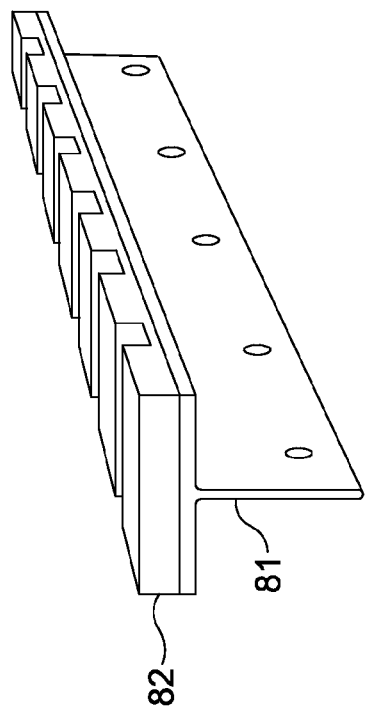
Figure 13A:
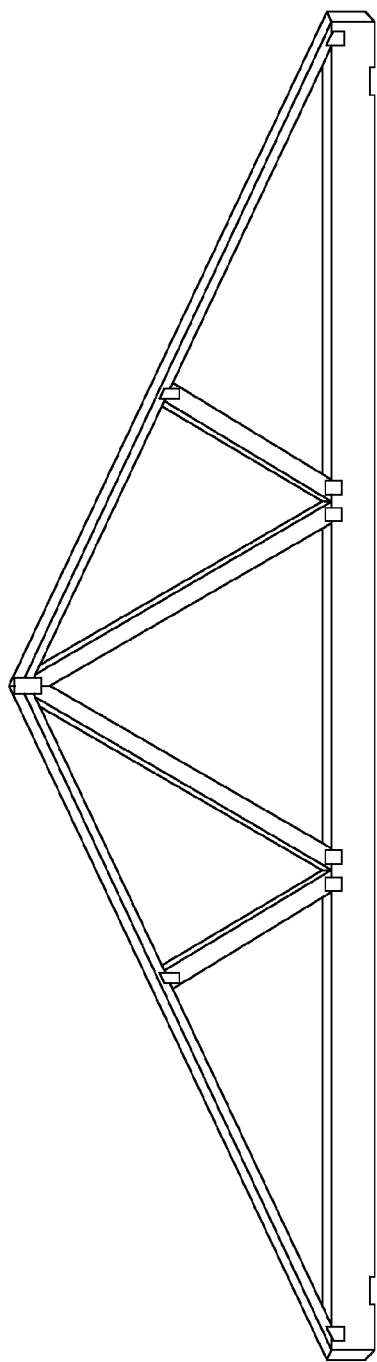
Figure 13B:
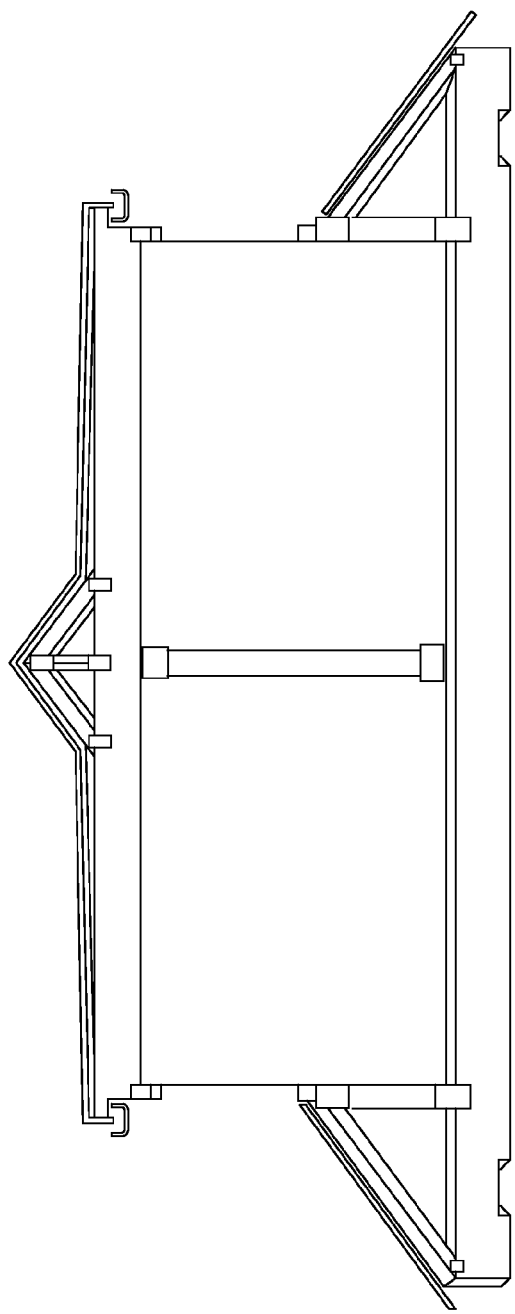

The invention will now be described, by way of example, with reference to the accompanying drawings in which:

FIG. 1 shows a perspective view of a modular constructed building in accordance with the further aspect of this invention, FIG. 2 shows a schematic top view of the building shown in FIG. 1 with the roof removed, FIG. 3 shows a perspective view of a ground beam in accordance the first aspect of this invention, FIGS. 4 and 5 show different forms of interconnecting corners of adjacent ground beams, FIG. 6 shows a schematic view of a wall panel for use in the building, FIG. 7 shows an expanded part view of a wall panel, FIG. 8 shows an end view of a ground beam supporting a wall panel and a floor joist, FIG. 9 shows an expanded top view of adjoining wall panels, FIG. 10A shows a side view of wall panels prior to interlinking, FIG. 10B shows the wall panels of FIG. 10A interlinked, FIG. 11 shows a vertically extending L-shaped member for securing the corners of adjacent wall panels, FIG. 12A shows a perspective view of a T-shaped member for supporting roof trusses, FIG. 12B shows an X-shaped member for supporting upper story wall panels and upper story floor joists, FIG. 12C shows a T-shaped member for securement to a wall of an existing building for location of extension wall panels, FIGS. 13A and 13B show differing forms of roof trusses.

DETAILED DESCRIPTION OF THE DRAWING FIGURES AND PREFERRED EMBODIMENTS

In the Figures like reference numerals denote like parts.

Referring to FIGS. 1 and 2, a modular constructed building has wall panels 2, some of which may include a window 3 and/or a door 4.

The panels 2 may be 300 mm, 600 mm or 1200 mm wide and 2.4 mm high, although these dimensions are not intended to be limiting. The building 1 has roof panels 5 and floor panels 6 and the roof and floor panels may be, for example, 600 mm wide×2.4 m long.

An example of a ground beam 30 will now be described with reference to FIG. 3 and in the exemplary embodiment the ground beam 30 is formed of three separate box sections, although it is to be understood that the beam may have other configurations such as an inverted T or I-shape. In the embodiment shown in FIG. 3, the ground beam has three longitudinally extending box sections 31, 32 and 33, Box sections 31 and 32 have the same height with upper planar surfaces 34 and 35 at the confluence of which is a longitudinally extending male projection 36 which is arranged to be inserted into a wall panel, as will hereinafter be described. The height of projection 36 may be 75 mm.

The box section 33 has a lower height than the box sections 31 and 32 and has an upper planar surface 37 that is longitudinally extending and which is capable of supporting one or more floor joists or floor panels. Outwardly and longitudinally extending from box sections 31 and 33 are flanges 38, 39 for providing an increased load bearing surface. The flanges 38 and 39, which may 30 mm wide, may have a 5 mm thick plate washer 381, 391 secured thereon for attachment bolts (not shown) into a foundation (not shown). In this respect, the ground beams will normally be laid on a base which may be of concrete or a pad and beam or pylon or a raft.

The ground beam may be made of any suitable material, but is, preferably, made of glass reinforced plastic (GRP) for lightness, and yet exhibiting great strength. The ground beam may be pre-formed or drilled with holes 40 for fixing wall panels or floor joists.

In the exemplary embodiment, the ground beams are laid in a rectilinear shape, although it is to be understood that the beams and wall panels may be shaped as desired.

As shown in FIG. 4, adjacent corners of ground beams 30 are butt-jointed together and secured by inner and outer L-shaped brackets 31, 32 with securing bolts 33 and associated nuts and washers 340.

In an alternative form of joining the corners of adjacent ground beams, they may be mitred, as shown in FIG. 5.

An exemplary wall panel will now be described with reference to FIGS. 6 and 7.

The wall panel 2 is a sandwich construction and has an internal 12 mm thick "Fermacell™ interior finished wall 61 supported by internal spacer batons 62, the other side of which is a fire-resistant sheet 63 that may be 3.2 mm thick. On the opposite side of the fire-resistant sheet 63 from the batons 62 is a pair of frames 64 between which is sandwiched a 6 mm thick metal reinforcing strip 65. Insulation (not shown) may also be sandwiched between the two frames 64. A 3 mm thick polypropylene sheet 66 positioned over an outer surface of the frame and a number of spacer batons 67 are mounted over the polypropylene sheet 66. The spacer batons 67 provide support for a 3 mm thick external finishing panel 68, which may have a brick or render finish. It is to be understood that the dimensions given herein are by way of example only.

As shown in FIG. 8, an underside of the wall panels is provided with a slot into which the projection 36 is accommodated and the lower surfaces of the wall panel are located on upper planar surfaces 34 and 35. Fixing bolts (not shown in FIG. 8) are inserted through the wall panel and the projection 36 to secure the wall panel to the ground beam 30.

In FIG. 8, at the top of the wall panel is another slot into which is inserted a T-shaped member 81 acting as a truss/wall plate flange projecting downwardly into the panel by, for example, 75 mm. Bolts, not shown, are inserted through the wall panel and T-shaped member 81 so as to secure the upper end of the wall panels together. The T-shaped member 81 has an upper planar surface provided with a member 82 that is notched to accept roof trusses, shown in FIGS. 13A, 13B. The surface 37 is arranged to accept a floor joist or floor board, and such a floor joist is referenced 83 in FIG. 8.

The exploded top view (or bottom view) of two adjacent wall panels is shown in FIG. 9 partly assembled and ready to fit onto the projection 36 of the ground beam or the T-piece 81. For each wall panel opposite to the reinforcing strip 65 is a groove 650 for accommodating a protruding portion of the strip 65. In this manner, adjacent panels are butted together and held by a tongue and groove arrangement. When two adjacent panels are butted together a bolt 91 passes through the strip 65 to screw into a threaded plate washer 93. In the present embodiment, the strip 65 is T-shaped and is secured to the frame 64 associated therewith by counter sunk screws 94.

FIG. 10A shows three spaced apart and ready for being locked together, and FIG. 10B shows the panels slotted into one another and locked together by, for example bolts. When attached to the ground beam 30 and T-shaped member 81, a strong and rigid, fully insulated load-bearing panel is provided.

The wall panels 2, at each vertical corner, are supported by a vertically extending L-shaped member 110 shown in FIG. 11. The L-shaped member has a male protrusion 111 in one limb and a female recess 112 in the other limb so as to engage with appropriate recesses and protrusions respectively in adjacent wall panels. The male protrusion 111 and limb accommodating the female recess 112 are drilled for securing the L-shaped member to an associated wall panel.

FIG. 12A shows a T-shaped member 81 having the member 82 notched for roof trusses. In this respect, the arrangements shown in FIG. 8 is suitable for a bungalow.

If it is required to construct a two-story building, then on top of the lower wall panels a cruciform or X-shaped member 120, shown in FIG. 12B, is employed for securement into lower and upper wall panels and upper story floor joists.

Referring to FIG. 12C, a T-shaped strip 121 is shown which may be attached vertically to an outside wall of a traditionally built building to accept a female edge of a wall panel, enabling the erection of a modular extension.

FIGS. 13A and 13B show differing forms of roof truss, FIG. 13A depicting a pitched roof, which may accommodate lightweight plastic tiles, and FIG. 13B showing a gang-nailed flat roof dormer truss.

Each panel 2 has high compressive resistance in the vertical plane and because the structure is mounted on ground beams, so it is also highly earthquake-resistant up of 5.9 on the Richter Scale or greater and hurricane-resistant able to withstand winds of up to 140 mph.

It is envisaged that joints between the panels may be sealed with mastic or other sealing material.

It will be understood that such a building may be constructed using simple tools by being bolted or screwed together and once ground preparation is completed it is envisaged that a weather-proof structure may be built in two or three days ready for fitting out.

The invention claimed is:

1. A modular constructed building, comprising a plurality of ground beams and a plurality of wall panels, each said ground beam of said plurality of ground beams having a pair of surfaces and a longitudinally extending male projection interspaced between said pair of surfaces, said extending male projection being formed as a flat plate and capable of being at least partially inserted into a wall panel of said plurality of wall panels, and means for securing each of said wall panels to said ground beam, wherein each of said wall panels, at an upper end opposite said ground beam when the flat plate is inserted into the wall panel, has a lateral groove for a protrusion of a T-shaped member or an X-shaped member, wherein the upper end of each of said wall panels is retained together by additional means for securing extending through each of said wall panels for either said T-shaped member or said X-shaped member.

2. The modular constructed building according to claim 1, wherein each of said ground beams is formed of two conjoined longitudinally extending box sections, each box section of said conjoined longitudinally extending box sections providing one surface of said pair of surfaces, and at a confluence between the box sections is said longitudinally extending male projection.

3. The modular constructed building according to claim 2, wherein each of said ground beams includes an additional longitudinally extending box section having a lower height than said two conjoined longitudinal box sections, so that a planar upper surface of said additional longitudinal box section is capable of supporting one or more floor joists or floor panels.

4. The modular constructed building according to claim 1, wherein each of said ground beams is formed in a rectilinear shape with adjacent corners of each said ground beam being connected together.

5. The modular constructed building according to claim 1, wherein each of said wall panels includes interlinking means for interconnecting with an adjacent wall panel of said wall panels.

6. The modular constructed building according to claim 1, wherein said interlinking means is a tongue and groove arrangement.

7. The modular constructed building according to claim 1, wherein each of said wall panels having vertical corners supported by a vertically extending L-shaped member having a male protrusion extending from a first limb of the L-shape and a female recess extending into a second limb of the L-shape for engaging with recesses and protrusions, respectively, in adjacent wall panels.

8. The modular constructed building according to claim 7, further comprising additional securing means for securing said L-shaped member to one of said wall panels.

9. The modular constructed building according to claim 1, wherein for accommodating a roof truss, said T-shaped member has an upper planar surface shaped for accepting the roof truss.

10. The modular constructed building according to claim 1, wherein said X-shaped member is arranged for supporting upper storey wall panels and upper storey floor joists.

* * * * *